United States Patent [19]

Zawodny et al.

[11] Patent Number: 5,453,808
[45] Date of Patent: Sep. 26, 1995

[54] PREWIND CAMERA WITH FILM INTERLOCK

[75] Inventors: Arthur Zawodny, Easton, Pa.; Eli Shoer, Spring Valley, N.Y.

[73] Assignee: Concord Camera Corporation, Avenel, N.J.

[21] Appl. No.: 213,359

[22] Filed: Mar. 15, 1994

[51] Int. Cl.⁶ ................................. G03B 1/00
[52] U.S. Cl. .................................... 354/212
[58] Field of Search .................... 354/212–215

[56] References Cited

U.S. PATENT DOCUMENTS 4,419,001 12/1983 Tominaga et al. ............... 354/214
4,610,522 9/1986 Tobioka et al. ................... 354/214
4,678,303 7/1987 Malloy Desormeaux ......... 354/214

Primary Examiner—David M. Gray
Attorney, Agent, or Firm—Robert D. Schaffer; Rogers and Wells

[57] ABSTRACT

A camera is disclosed wherein the film is unwound from the film cartridge prior to use. The camera has a preventative mechanism for precluding an unaccustomed user from backing the film into the cartridge before the film has been substantially unwound.

8 Claims, 3 Drawing Sheets

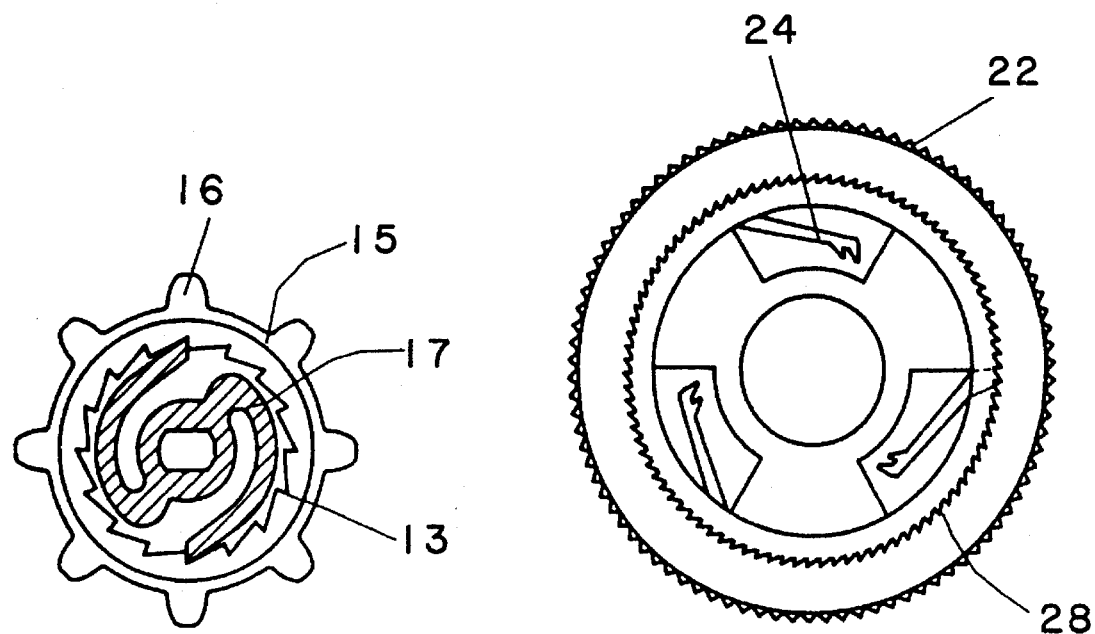
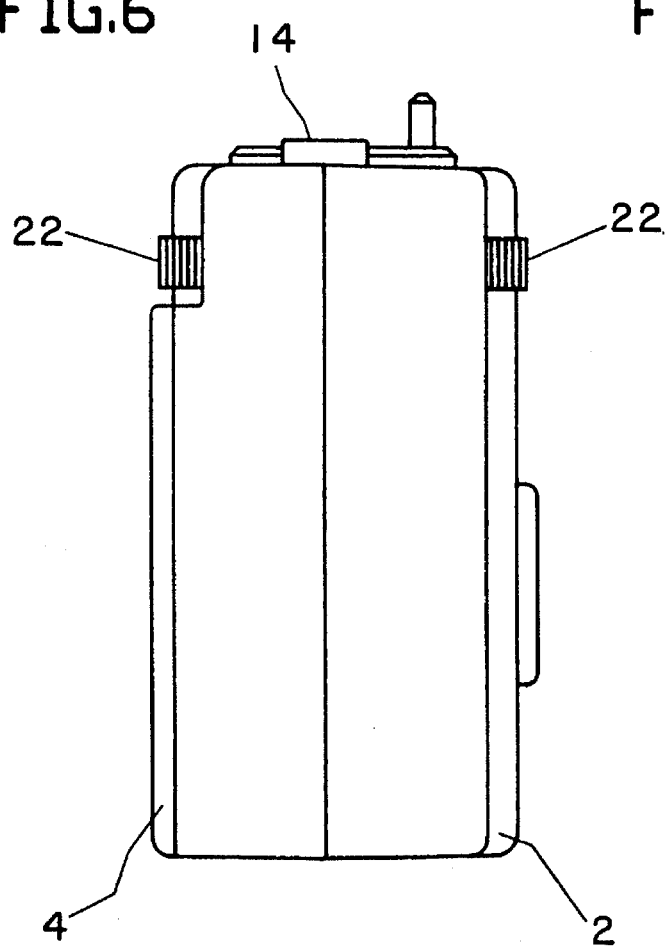
FIG.6  FIG.7
FIG.5

PREWIND CAMERA WITH FILM INTERLOCK

BACKGROUND OF THE INVENTION

1. Field of the Invention

This invention generally relates to cameras in which the film is completely unwound from its receptacle prior to use. Specifically, this invention relates to relatively low-priced, manually operated cameras in which the film is prewound. In particular, this invention relates to a camera having a film interlock mechanmism for preventing a user from rewinding unused film into its receptacle before the film is completely unwound.

2. Description of the Related

There have been many different types of low-priced, manually operated film advance mechanisms in recent years. This has been a result of the expanding market and technical development of disposable cameras.

However, the very characteristics that afford such cameras to be low priced and hence disposable also yield certain disadvantages. One such drawback is that disposable cameras are preloaded with film having a limited shelf life. The shelf life of the film is approximately 1.5 years. If the film in the disposable camera is not used before this period of time elapses, the pictures taken from this film will be of substandard quality.

Another disadvantage of disposable cameras generally, is the very fact of their disposability. Although discarding after a single use may be advantageous to some consumers, environmental degradation and a waste of non-renewable natural resources is a concomitant result.

A further disadvantage of some prewind cameras, and some other manually operated permanent cameras as well, is after some pictures have been taken, if the film access door is accidentally opened, the exposed film is mined by having light exposed thereon. To avoid such accidents, after film loading, many cameras now fully unwind the unexposed film from its lightproof casing onto the receiving spool in the opposite chamber. Then, after each picture is taken, the exposed frame is backed onto its lightproof casing. When this procedure is utilized, if the film access door is accidentally opened, only unused, that is, unexposed film, is ruined and the exposed film having the pictures taken by being already backed into its casing is safely protected in its lightproof casing. An unfortunate side effect of this procedure, when it is manually operated, is that often the camera operator does not know what type of camera he is using, a conventional shoot-and-unwind camera, or a prewind camera that rewinds after each shot. If a consumer thinks he is using the former but instead is using the latter, upon loading the film, after the first picture shot, he will advance the film, that is, he will rewind the film back into the film casing, unable to be retrieved or used in its entirety. There is therefore a great need in the art for providing a feature on the camera for preventing this type of accident from occurring.

SUMMARY OF THE INVENTION

Accordingly, there is now provided with this invention an improved camera mechanism for overcoming the aforementioned difficulties and longstanding problems inherent in manually operated prewind cameras. These problems have been solved in a simple, convenient, and highly effective way by having a low-priced prewind camera that is able to be reused. More particularly, a mechanism is provided in a manually operated prewind camera for preventing rewinding film that has not been fully unwound.

According to one aspect of the invention, a photographic camera is disclosed having a film cartridge chamber for housing a film cartridge and a film receiving chamber for receiving film from the film cartridge. The film is substantially unwound from the film cartridge into the film receiving chamber before any pictures are taken. The camera comprises a film advancing means operatively connected to the film cartridge for winding the film into the film cartridge after a picture has been taken. The camera also comprises a film sensing means for releasably engaging the film advancing means for preventing said film advancing means from winding the film into the film cartridge before the film has been substantially unwound from the film cartridge.

As will be appreciated by those persons skilled in the art, a major advantage provided by the present invention is to prevent an unaccustomed user of a prewind camera from accidentally rewinding the film into the film cartridge before the entire roll of film could be used. It is therefore an object of the invention to automatically block a film advance wheel until film is substantially unwound from the film cartridge into the film receiving chamber.

It is another object of this invention to provide a camera wherein the metering wheel is disengaged from the shutter cocking mechanism during rewinding the film.

It is still another object of this invention to provide a manually-operable camera that is simple in construction and inexpensive to manufacture.

It is yet another object of this invention to provide a camera that is compact and light in weight.

It is a further objective of this invention to provide an exceedingly low cost camera which allows easily reloading film.

The method and apparatus of the present invention will be better understood by reference to the following detailed discussion of specific embodiments and the attached figures which illustrate and exemplify such embodiments.

BRIEF DESCRIPTION OF THE DRAWINGS

A specific embodiment of the present invention will be described with reference to the following drawings, wherein:

FIG. 5 is a side view of the camera illustrated in FIG. 1.

FIG. 6 is an enlarged plan view of the metering wheel having a oneway clutch.

FIG. 7 is an enlarged bottom view of the film advancing wheel.

DESCRIPTION OF THE PREFERRED EMBODIMENTS

The following preferred embodiment as exemplified by the drawings is illustrative of the invention and is not intended to limit the invention as encompassed by the claims of this application.

Figure 2:
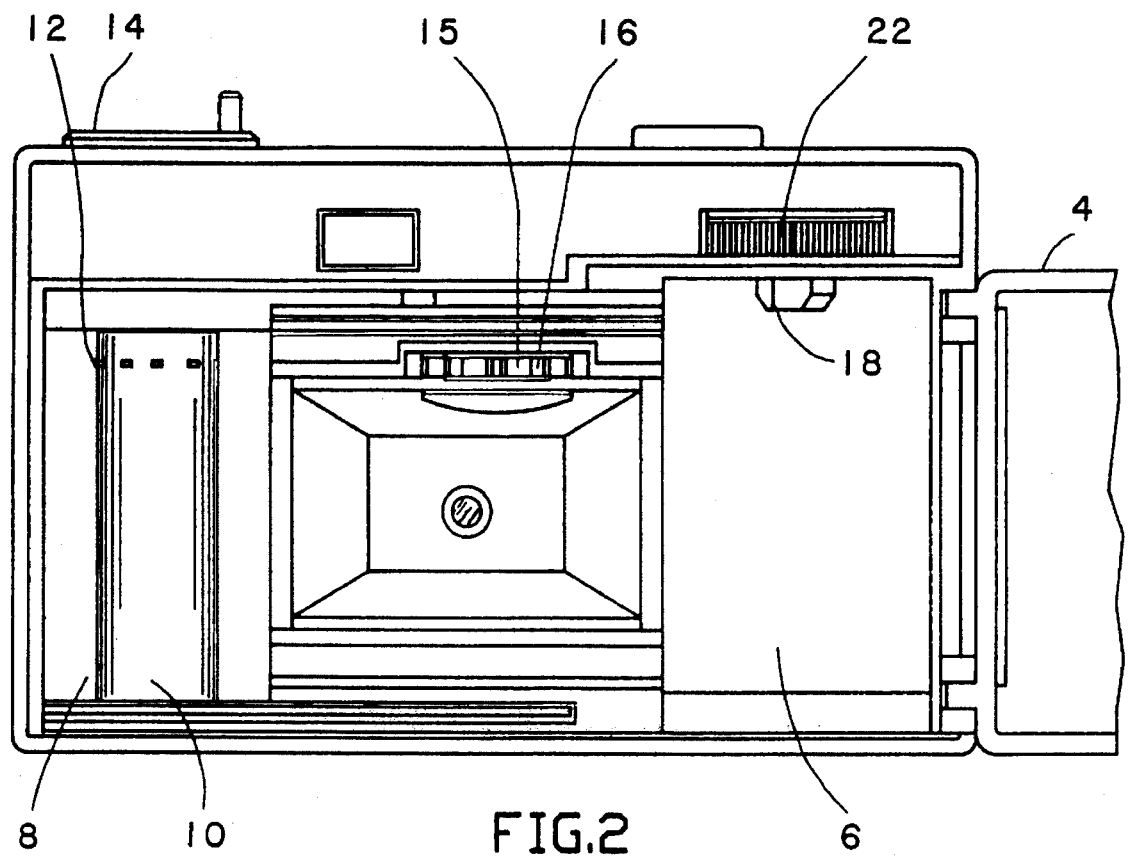
FIG. 2 is a rear elevation view of the camera of the present invention illustrating an open back cover.
Figure 1:
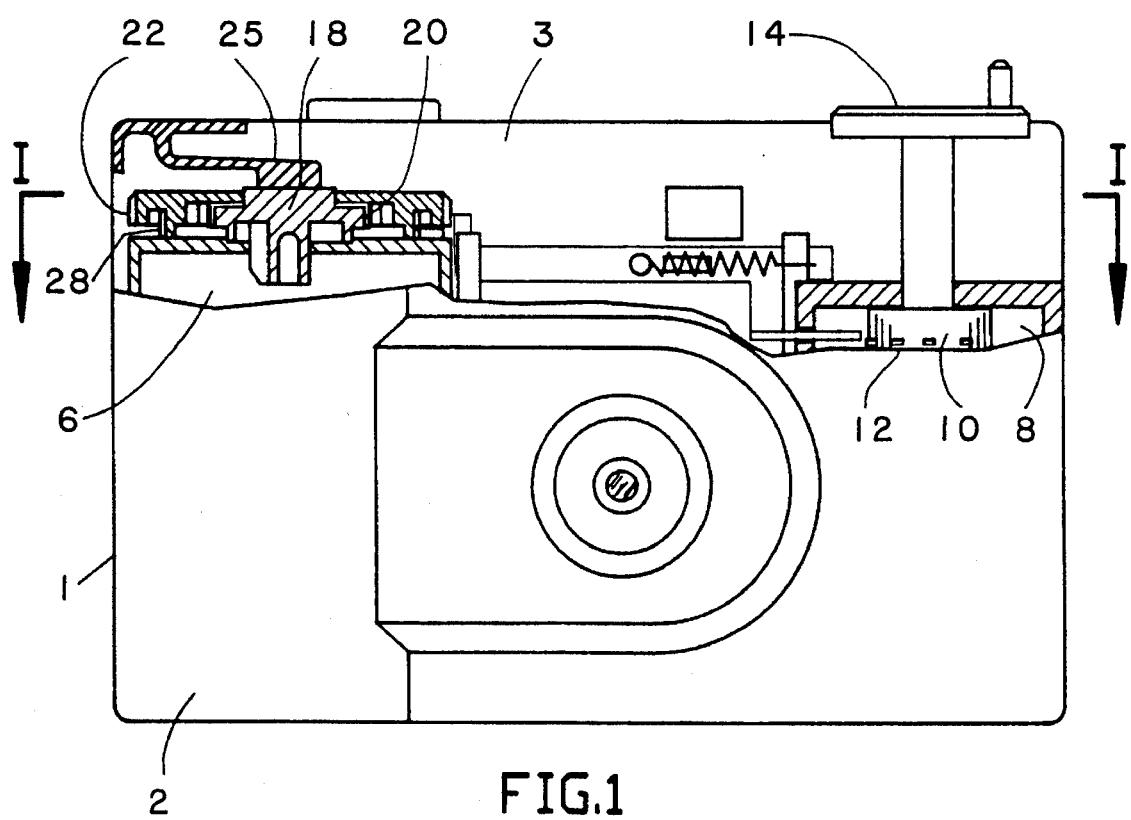
FIG. 1 is a front elevation view of the camera of the present invention with a cutaway portion exposing parts of the film advancing means.

As shown in FIGS. 1 and 2, a camera 1 is provided with a front 2 and a casing 3. A rear cover 4 is hingedly attached to the camera 1. As shown, particularly in FIG. 2, the interior of the camera is exposed illustrating a film cartridge chamber 6 for housing the film cartridge and a film receiving chamber 8 for housing film 9 unwound from the film cartridge.

In the embodiment illustrated in FIG. 2, the film receiving chamber 8 preferentially has a spool 10 therein for unwinding the film from the film cartridge (not shown) in the film cartridge chamber 6. Alternatively, the film receiving chamber 8 may be devoid of any permanently attached unwinding spool. In the absence of an unwinding spool, the film 9 may be unwound by a variety of externally temporarily applied mechanisms.

When the film receiving chamber 8 has a film receiving spool 10 positioned therein, the film receiving spool preferentially has teeth 12 for engaging perforations in the film and for advantageously unwinding the film thereon. Operatively attached to the film unwinding spool 10 is a manually operated rewinding disk 14 customarily located on the lefthand side of the top of the camera.

A metering wheel 15 is positioned in the path of the film 9 between the film cartridge chamber 6 and the film receiving chamber 8. The metering wheel 15 has teeth 16 for engaging the perforations in the film as the film reels between the two chambers. As the film rotates the metering wheel as it reels from the film receiving chamber 8 into the film cartridge, it engages a shutter cocking mechanism and a film counter as is well known in the art.

As shown more particularly in FIG. 6, the metering wheel 15 has internal teeth 13. A clutch 17 is disposed within the metering wheel 15. The clutch 17 is adapted for engaging the internal teeth 13 when the metering wheel 15 is turned counterclockwise and for allowing the metering wheel 15 to freely turn when rotated in the clockwise direction. By having such a mechanism, the metering wheel 15 is disengaged from the shutter cocking mechanism during the prewind of the film.

In the upper portion of the film cartridge chamber 6, a driving spindle 18 is positioned which is adapted for mating with and driving the internal spool of the film cartridge. The driving spindle 18 protrudes from the film cartridge chamber 6 into the casing 3 of the camera. The top of the driving spindle 18 forms a disk having teeth 20 surrounding the outer circumference of the driving spindle disk.

The driving spindle disk is positioned within and operatively connected to an advancing wheel 22. As shown particularly in FIG. 5, the advancing wheel 22 protrudes through, and is accessible to the user through the front 2 and the rear 4 of the camera. For ease of operation, the advancing wheel 22 is knurled on its outer surface. By virtue of being able to be accessed from the front and rear of the camera, a user may rotate the advancing wheel by simultaneous placement of fingers on the front and rear surface and thereby avoid any moment force about the driving spindle 18. When a user rotates the advancing wheel 22 after the film has been substantially unwound, the driving spindle 18 is made to rotate and thus roll up the film back into the film cartridge.

Figure 4:
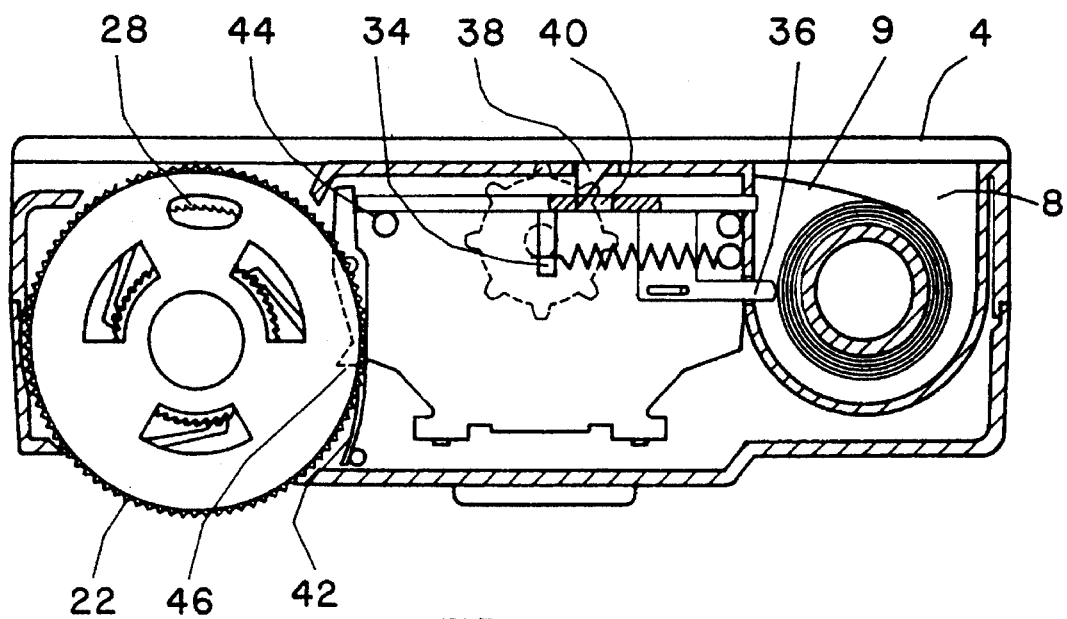
FIG. 4 is a sectional view of FIG. 1 taken along section line I—I showing the position of the camera parts after the film is substantially wound into the receiving chamber.
Figure 3:
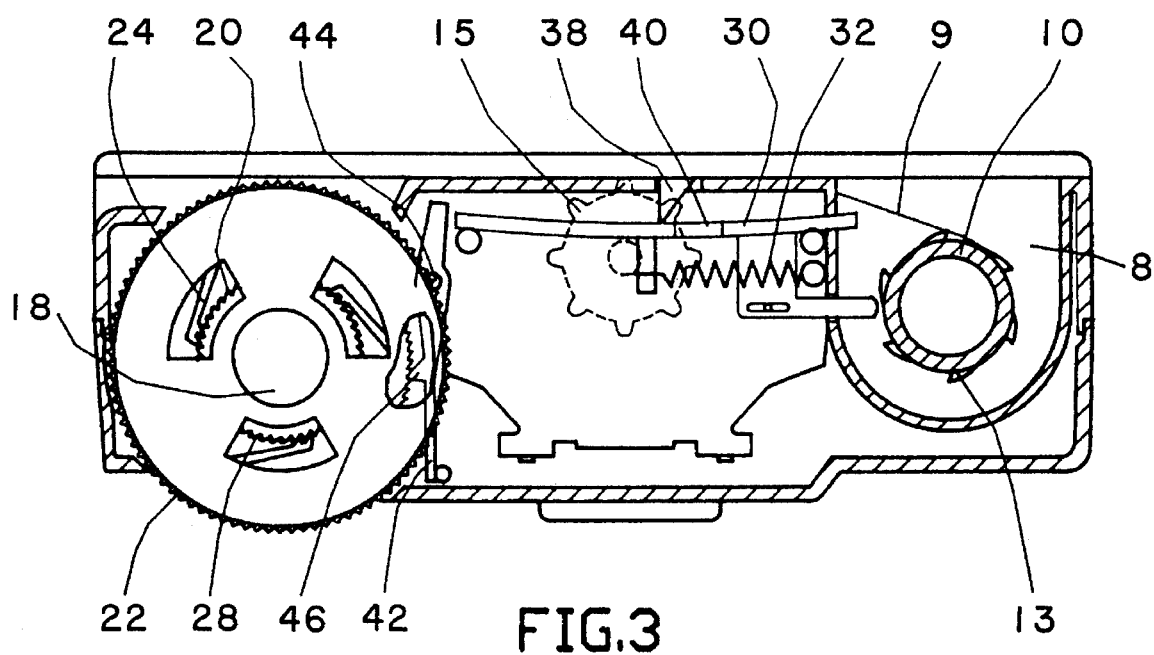
FIG. 3 is a sectional view of FIG. 1 taken along section line I—I showing the position of the camera parts before the film is unwound from the film cartridge into the receiving chamber.

As shown in FIGS. 3 and 4, the driving spindle 18 and the advancing wheel 22 form a one-way clutch. Pawls 24 are flexibly positioned inside the advancing wheel 22 for engaging with the teeth 20 of the driving spindle disk. As shown in FIG. 1, a resilient member 25 is fixedly attached to the inside of the top of the casing 3 of the camera. The resilient member 25 contacts the driving spindle 18 and frictionally prevents the driving spindle from rotating clockwise when the advancing wheel 22 is rotating clockwise. Thus, when the advancing wheel 22 is rotated clockwise the force exerted by the pawls 24 is overcome by the frictional contact of the resilient member 25 on the driving spindle thereby preventing the driving spindle from rotating.

However, when the advancing wheel 22 is rotated in a counterclockwise direction, the pawls 24 of the advancing wheel 22 engage the teeth 20 of the driving spindle 18 and thereby rotate the driving spindle and consequently roll the film back into the film cartridge.

As more particularly shown in FIG. 7, the advancing wheel 22 has teeth 28 on an inner concentric level. The teeth 28 on the advancing wheel 22 are adapted for mating with a locking mechanism for preventing an unaccustomed user from rewinding and backing the film roll into the film cartridge before a sufficient length of film has been unwound by the rewinding disk 14 onto the film receiving spool 10.

The interrelationship of the elements comprising the locking mechanism are shown in FIGS. 3 and 4. As shown in FIG. 3, a film sensor 30 in the form of an elongate bar is disposed in the casing 3 of the camera. The film sensor 30 is slidable along its longitidudinal axis from side to side in the camera body. The film sensor 30 is biased towards the film receiving chamber 8 by a spring 32. In the embodiment illustrated, the spring 32 is attached to the elongate bar of the film sensor by a tongue 34 fixedly attached to the elongate bar of the film sensor 30. Of course, the film sensor 30 could be biased toward the film receiving chamber 8 by a wide variety of mechanical linkages.

An arm 36 is attached at the end of the film sensor nearest the film receiving chamber 8. As shown in FIG. 4, the arm 36 of the film sensor 30 is adapted for extending into the film receiving chamber 8 and resting upon the roll of film unwound therein.

A protruded portion 38 is attached on the rear cover 4 of the camera. A slit is strategically disposed in the length of the elongate bar of the film sensor 30. The protruded portion 38 is provided for engaging the slot 40 of the film sensor 30 when the film 9 is to be rewound into the film cartridge by the advancing wheel 22.

A flexible member 42 is disposed substantially tangent to the advancing wheel 22. The flexible member 42 is mounted upon and pivots about a pin 44. A tooth 46 extends from the central portion of the flexible member 42. The tooth 46 is adapted for engaging the teeth 28 of the advancing wheel 22 when this flexible member 42 is pivoted thereupon. The far end of the flexible member 42 extends in the traversing path of the elongate bar of the film sensor 30. When the film sensor 30 is pushed toward the film cartridge chamber 6 because of the presence of a roll of film 9 in the film receiving chamber, as shown in FIG. 4, the film sensor 30 pushes the far end of the flexible member 42 pivotally disengaging the tooth 46 from the teeth 28 of the locking wheel 22.

The camera of the present invention is operated in the following manner. The operator inserts the film cartridge into the film cartridge chamber 6 and places the film leader over the teeth 12 of the film receiving spool 10. The back cover 4 is then closed as shown in FIG. 4. At this time, the film sensor 30 is in its biased position towards the film receiving chamber 8. This is illustrated in FIG. 3. When the film sensor 30 is in this position, the slot 40 of the film sensor 30 is not engaged with the protruded position 38. Also, at this point, because a minimal amount of film 9 is wound upon the film receiving spool, the tooth 46 of the flexible member 42 is engaged with the teeth 28 of the advancing wheel 22. The engagement of the flexible member 42 with the teeth 28 of the advancing wheel 22 prevents a user from rotating the advancing wheel 22 and rewinding the minimal amount of extended film back into the film cartridge chamber, from which it could not be extracted.

After the rear cover 4 of the camera has been closed, the user unwinds all of the film 9 from the film cartridge onto the film receiving spool 10 by rotating the rewinding disk 14. As the film is wound from the film cartridge to the film receiving spool 10, although the perforations in the film engage the teeth 16 of the metering wheel 15, the internal clutch mechanism disengages the metering wheel from the counter. Only when the film is rewound back into the film cartridge does the metering wheel engage the counter. In this way, the camera counts the number of pictures that have been taken.

As illustrated in FIG. 4, after a sufficient amount of film 9 has been rolled upon the receiving spool 10, the film sensor 30 is pushed away from its biased position toward the film cartridge chamber 6. This movement pushes the film sensor upon the flexible member 42 pivoting the flexible member about the pin 44 and disengaging the tooth 46 of the flexible member 42 from the teeth 28 of the advancing wheel 22. Also, when the film sensor 30 has moved toward the film cartridge chamber 6, the protruded portion 38 engages the slot 40 of the film sensor 30 and maintains it in this position. Now the user is able to rotate advancing wheel 22 which cocks the shutter and reels the film roll into the film cartridge after a picture has been taken.

When the rear cover 4 of the camera is opened, the protruded portion 38 is withdrawn from the slot 40 and the spring 32 brings the film sensor 30 back into its original position.

Although the particular embodiment shown and described above will prove to be useful in many applications in the photographic arts to which the present application pertains, further modifications will occur to persons skilled in the art. All such modifications are deemed to be within the scope and spirit of the present invention defined by the appended claims.

We claim:

1. A photographic camera having a film cartridge chamber for a film cartridge and a film receiving chamber for receiving film from the film cartridge, wherein the film is substantially unwound from the film cartridge into the film receiving chamber before any pictures are taken, comprising:
   a) film advancing means operatively connected to the film cartridge for winding the film into the film cartridge after a picture has been taken; and
   b) film sensing means for releaseably engaging said film advancing means for preventing said film advancing means from winding the film into the cartridge before the film has been substantially unwound from the film cartridge; wherein said film sensing means is adapted for moving between a first position and a second position, wherein when said film sensing means is in said first position, said film sensing means releasably engages raid film advancing means and when said film sensing means is in said second position, said film sensing means is disengaged from said film advancing means.

2. The camera of claim 1, further comprising biasing means for biasing said film sensory means in said first position.

3. The camera of claim 2, wherein said film sensing means further comprises engaging means for maintaining said film sensing means in said second position when said film sensing means has been released from said first position.

4. The camera of claim 3, wherein said engaging means comprises a portion protruding from said camera adapted for engaging a slot in said film sensing means.

5. The camera of claim 3, wherein the film unwound from the film cartridge moves the film sensing means from said first position to said second position.

6. The camera of claim 5, wherein said film advancing means comprises a wheel having teeth thereon, adapted for releasably engaging said film sensing means when said film sensing means is in said first position.

7. The camera of claim 6, wherein said film advancing means is rotatably accessible from both the front and the rear of the camera.

8. The camera of claim 7, wherein said film advancing means comprises a knurled wheel for winding the film back into the film cartridge.

* * * * *